Nov. 15, 1966  SHAO-TANG LEE  3,285,540
SHIFTABLE VARIABLE AREA WING CONSTRUCTION
Filed June 15, 1964  4 Sheets-Sheet 1

*Shaotang Lee*
INVENTOR.

Nov. 15, 1966  SHAO-TANG LEE  3,285,540
SHIFTABLE VARIABLE AREA WING CONSTRUCTION
Filed June 15, 1964  4 Sheets-Sheet 2
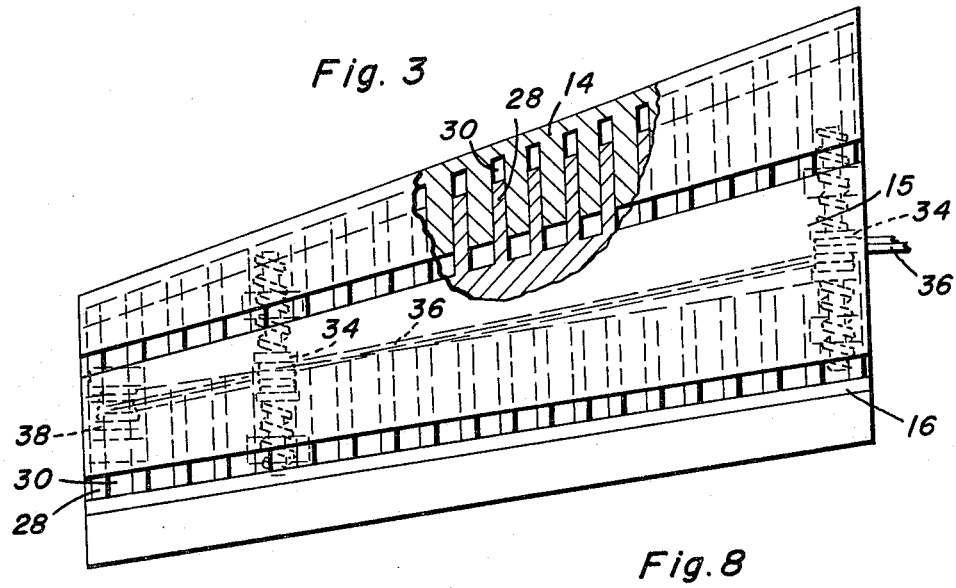
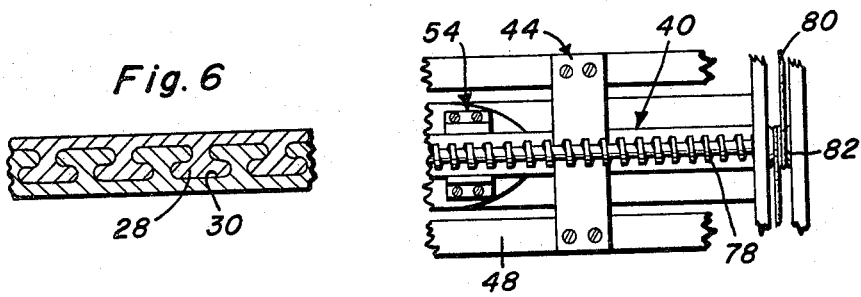
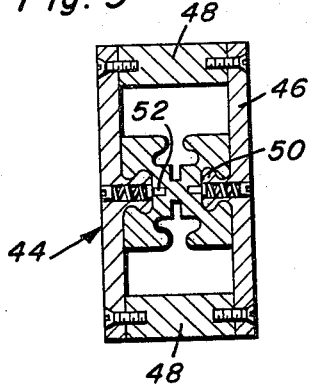
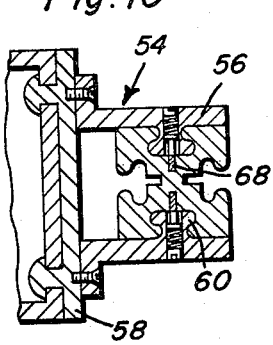
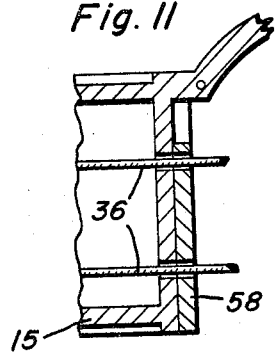
Shao-Tang Lee
INVENTOR.

Shao-Tang Lee
INVENTOR.

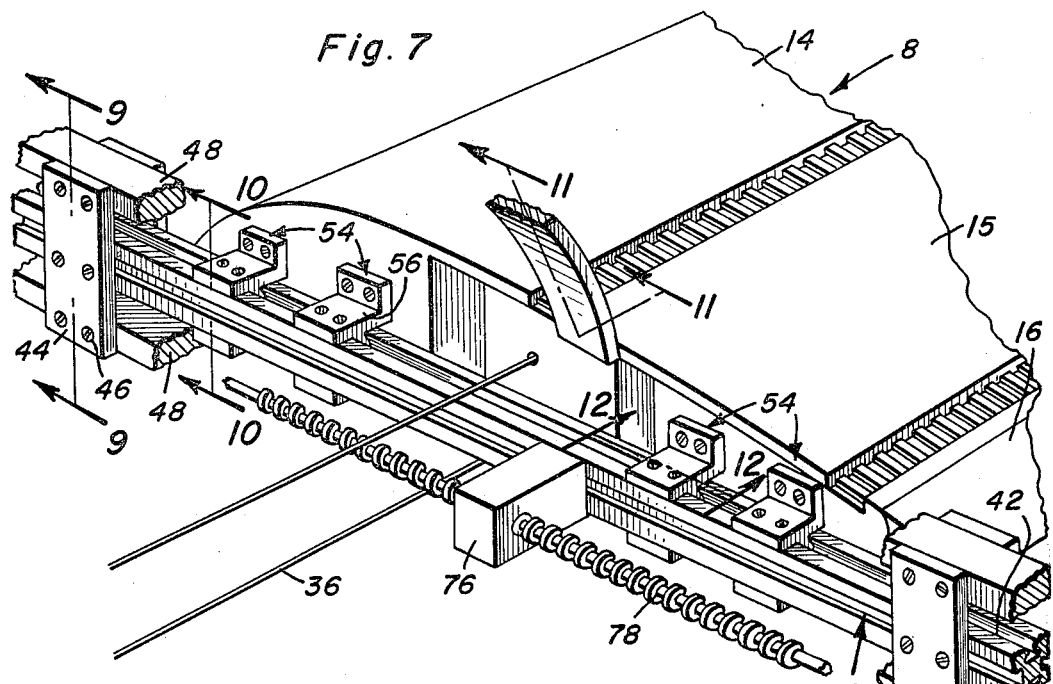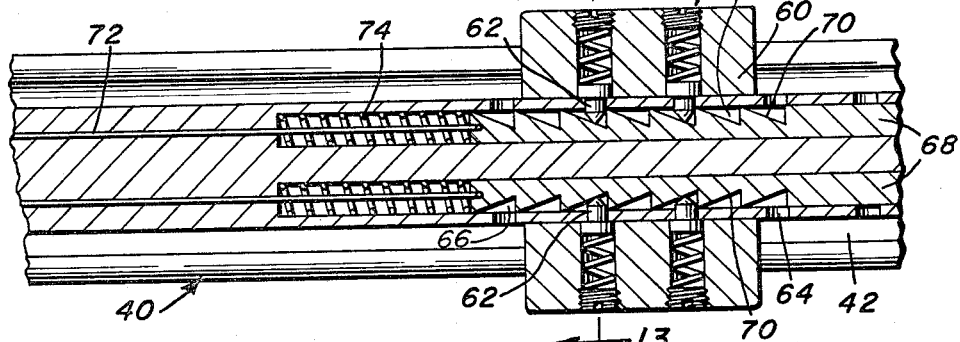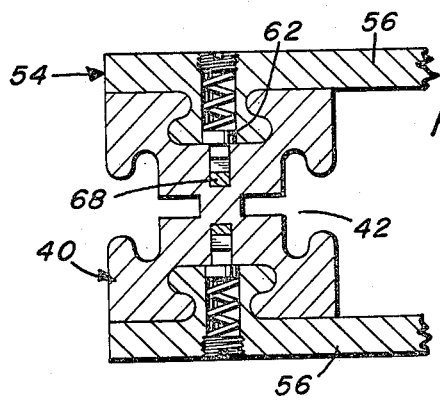

United States Patent Office 3,285,540
Patented Nov. 15, 1966

3,285,540
SHIFTABLE VARIABLE AREA WING
CONSTRUCTION
Shao-tang Lee, 25 Chi-kuang St., Taichung,
Taiwan, Republic of China
Filed June 15, 1964, Ser. No. 375,391
6 Claims. (Cl. 244—43)

The instant application, a continuation-in-part of application Serial No. 219,652, filed August 27, 1962, now Patent No. 3,165,280, generally relates to aircraft wing construction, and more particularly is concerned with construction whereby the area of the wing can be varied, either through a widening or through an extension thereof.

It is a primary object of the instant invention to provide means whereby the area of aircraft wings can be varied so as to assist in accommodating the aircraft to low landing and takeoff speeds, in conjunction with high airborne speeds, in addition to the other advantages normally associated with the variation of the wing area.

Another particularly significant object of the instant invention is to provide a unique construcion whereby the wing variation can be effected in a manner which produces a positive wing expansion and contraction effectively controllable from the aircraft.

These together with other objects and advantages which will become subsequently apparent reside in the details of construction and operation as more fully hereinafter described and claimed, reference being had to the occompanying drawings forming a part hereof, wherein like numerals refer to like parts throughout, and in which:

FIGURE 3 is a plan view with portions broken away detailing one of the variable area wings;

FIGURE 6 is a typical cross-section through the slidably overlapped portions of the wing illustrating the tongue or rib and groove interlock therebetween;

FIGURE 7 is a perspective detail of the inner end of one of the variable area wings illustrated in conjunction with mounting portions of the fuselage and the control means utilized in effecting a shifting of the wing;

FIGURE 8 is a view detailing a portion of the wing shifting control mechanism;

FIGURE 9 is a cross-setional view taken substantially on a plane passing along line 9—9 in FIGURE 7;

FIGURE 10 is a cross-sectional view taken substantially on a plane passing along line 10—10 in FIGURE 7;

FIGURE 11 is a partial cross-sectional view taken substantially on a plane passing along line 11—11 in FIGURE 7;

FIGURE 12 is an enlarged cross-sectional view taken substantially on a plane passing along line 12—12 in FIGURE 7;

FIGURE 13 is a cross-sectional view taken substantially on a plane passing along line 13—13 in FIGURE 12.

Figure 1:
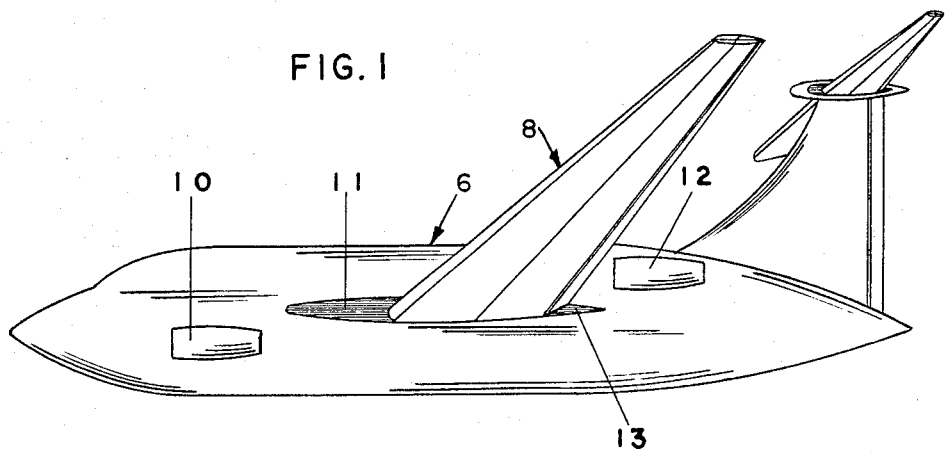
FIGURE 1 is a side elevation of an aircraft incorporating the variable area wings of the instant invention, in conjunction with a variable area tail stabilizer constructed and operated in generally the same manner as the wings.
Figure 2:
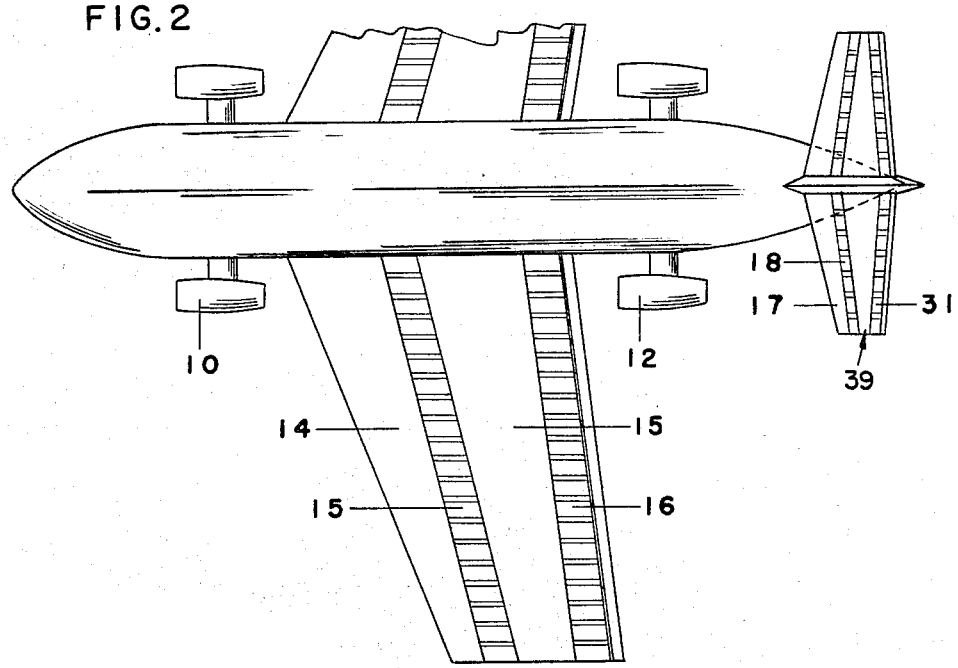
FIGURE 2 is a top plan view of the aircraft.

Referring now more specifically to the drawings, reference numeral 6 has been used to generally designate an aircraft incorporating the wing construction of the instant invention, each of the aircraft wings being herein generally referred to by reference numeral 8. The particular aircraft 6 illustrated in FIGURES 1 and 2 includes a set of lower front jets 10 and a set of rear upper jets 12, which may be rotatably mounted as desired in accordance with the particular type of aircraft involved.

Each of the wings 8, which are expansible in nature, consists of three full length segments, the front segment 14, the intermediate segment 15 telescopically received within the open rearwardly directed edge of the front segment 14, and the rear segment 16 telescopically received within the open rear edge of the intermediate segment 15. Each of the segments, shaped so as to cooperate with the remaining segments so as to define an acceptable wing configuration, includes upper and lower panels 14', 14", 15', 15", 16', 16". The upper and lower or top and bottom panels of each of the segments 14, 15 and 16, are suitably positioned relative to each other so as to define a substantially hollow wing construction by internal supporting structure including vertical braces 20, 22 and 24 with at least two sets of these braces being transversely aligned across the wing 8 for the accommodation of the wing expansion and contraction shafts 26.

Figure 4:
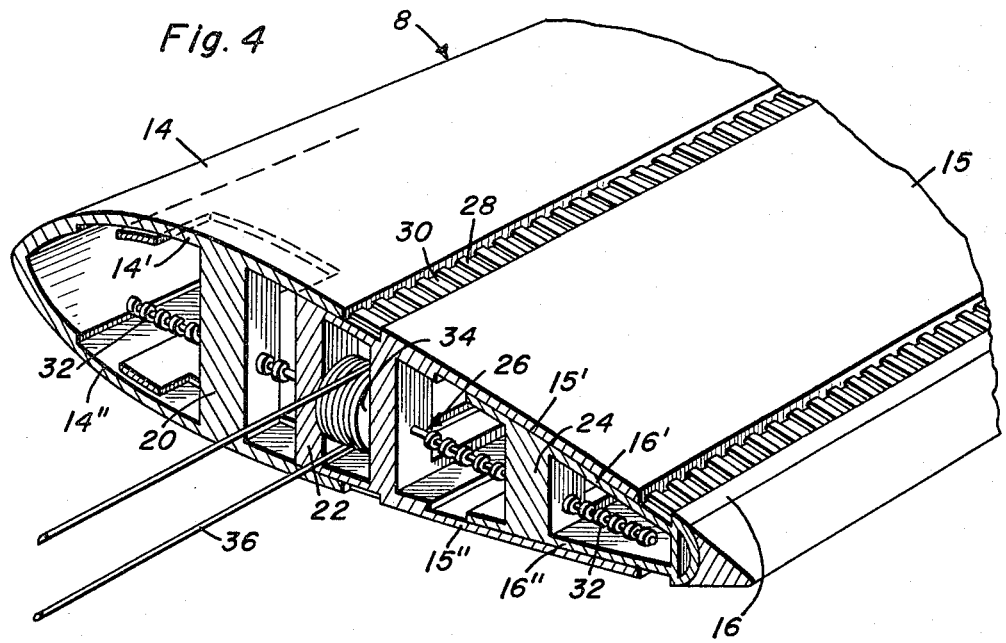
FIGURE 4 is a broken away perspective view illustrating the wing construction and a portion of the operating mechanism associated therewith.

The segments 14, 15 and 16 have the respective panels thereof locked to the corresponding panels of the adjacent segment or segments for movement solely in a lateral direction relative to each other by means of a continuous series of slidably interlocking undercut ribs and grooves 28 and 30, the nature of this sliding interlock being best appreciated from FIGURE 6. With reference to FIGURE 4, it will be noted that the ribs and grooves on the panels 14' and 14" are on the inner surfaces thereof so as to slidably mate with the ribs and grooves 28 and 30 on the outer surfaces of the front portions of the panels 15' and 15". In turn, the ribs and grooves 28 and 30 are on the outer surfaces of the panels 16' and 16" so as to slidably mate with the ribs and grooves on the under or inner surfaces of the rear portions of the panels 15' and 15". It is through this particular rib and groove interlock that a highly stable union is provided between the segments 14, 15 and 16, while still enabling the desired expansion and contraction.

Figure 5:
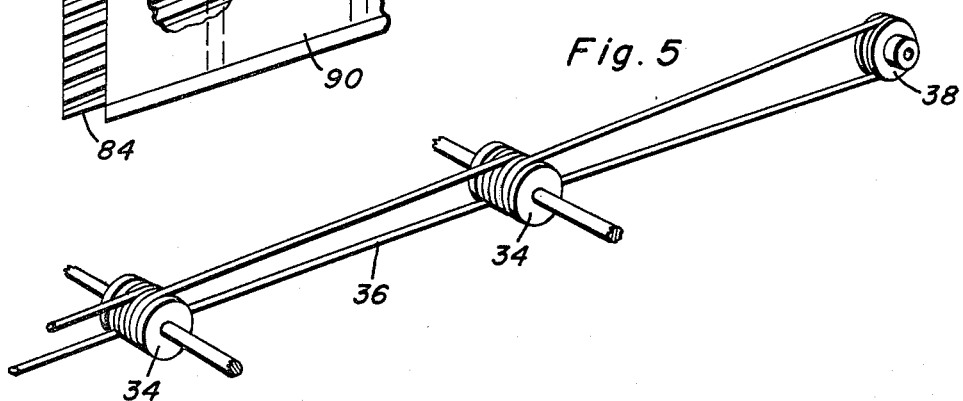
FIGURE 5 is a schematic illustration of the cable and pulley arrangement of the control mechanism.

The actual expansion and contraction of the outer wing segments 14 and 16 relative to the intermediate wing segments 15 is achieved utilizing a pair of the elongated shafts 26. Each of these shafts 26 includes opposite spiralling threads on the opposite end portions 32 thereof, and a central control pulley 34 about which the control cable 36 is to be wound. Each shaft 26 is to be supported and operatively engaged with a transversely aligned set of braces 20, 22 and 24 with the intermediate portion of the shaft 26 rotatably supported within the two intermediate segment braces 22 between which is located the control pulley 34. Each of the threaded outer portions 32 of the shaft are in turn threadedly engaged through internally threaded bores within the forward and rear segment braces 20 and 24. In this manner, upon a rotation of the shafts 26, which is effected simultaneously, in a first direction, the segments 14 and 16 will move outwardly relative to the intermediate segment 15, and upon a rotation of the shafts 26 in the opposite direction, the segments 14 and 16 will move inwardly toward the segment 15, thereby effecting an expansion or contraction of the wing 8 as desired. With reference to the schematic illustration in FIGURE 5, it will be appreciated that the cable 36 has the two runs thereof extending from engagement about an idler pulley 38 located toward the outer end of the wing 8 within the intermediate segment 15 inwardly to engagement with the outermost shaft pulley 34 about which the runs of cable are suitably wound in opposite directions, after which they are continued to the next shaft pulley 34 wherein the opposite winding thereof is also effected prior to an extension of the cable runs to the interior of the fuselage from whence they can be suitably controlled so as to effect the desired rotation of the shafts 26 and the corresponding expansion and contraction of the wing segments. In order to obtain a more exact control of the rotation of the shafts 26, portions of the cable runs can, prior to a winding thereof, be fixed to the individual pulleys 34. Further, it should be appreciated that a gearing control mechanism can also be utilized so as to effect the desired rotation of the shafts 26. Incidently, it should be appreciated that the above-described expansion and retraction features can also be incorporated into the stabilizer 39 which can include three segments 17, 18 and 31 also slidably engaged through the afore described full length series of ribs and grooves.

Referring now specifically to FIGURES 7 through 13, the structure for effecting a selective release and locking of the movable segments 14 and 16, as well as the structure for effecting a longitudinal adjustment of the wing 8 as a unit along the fuselage, will be described. An elongated rectangular mounting rail 40, one of course being associated with each wing 8, is mounted within the plane fuselage generally paralleling the base of the wing 8. The mounting rail 40 has four undercut grooves 42, one in each face, along the full length thereof with the grooves 42 in the opposed vertical sides of the rail 40 being utilized in the mounting of the rail 40 within the fuselage in a manner whereby the rail 40 may be fixedly secured to the fuselage or slidable relative thereto. The actual mounting of each of the rails 40 is effected through a pair of mounting units 44, each including a pair of spaced vertical plates 46 suitably fixed to the fuselage, for example by engagement with upper and lower fuselage frame members 48, with the side plates 46 receiving the mounting rail 40 therethrough. Mounted within each of the side plates 46 of each mounting unit 44 is an inwardly projecting rib 50 which mates with and is slidably received within one of the mounting rail side grooves 42 so as to allow for a guided sliding movement of the mounting rail 40 through the mounting unit 44, both the grooves 42 and the ribs 50 of course being undercut so as to provide for the desired interlock. The selective locking of the mounting rail 40 within the mounting units 44 is effected by means of cam controlled spring-biased locking pins 52 mounted within the corresponding rib 50 and selectively engageable through holes within the bottom of the corresponding groove 42, all of which shall be explained in greater detail in connection with the same type of releasable lock associated with the mounting units 54 utilized in releasably locking the forward and rear segments 14 and 16 to the mounting rail 40.

The mounting units 54, to be utilized in conjunction with each of the segments 14 and 16, each include upper and lower plates 56 fixed to the inner face of the corresponding segment 14 or 16, which segment may or may not have a base plate 58 thereon, with these upper and lower plates 56 projecting inwardly into overlying and underlying relationship with the mounting rail 40. Each of the plates 56 includes an undercut inwardly projecting rib 60 which slidably mates with the corresponding rail groove 42. All of the mounting units 54 are to be simultaneously locked to the mounting rail 40 against sliding movement relative thereto or released for sliding movement relative thereto. This is effected by means of one or more spring-biased locking pins 62 associated with each rib 60 and projecting inwardly through apertures 64 within the bottom of the corresponding groove 42, the mounting rail 40, inwardly of the locking pin or pins 62 defining an elongated hollow interior chamber 66. Mounted within each chamber 66 is an elongated camming member 68 which includes a series of inclined camming faces 70 engageable against the locking pin or pins 62 in a manner whereby a movement of the member 68 in a first direction will effect a retraction of the corresponding locking pin or pins 62 so as to allow for a free sliding movement of the mounting member 54 on the rail 40, and thereby an adjustment of the segments 14 and 16 relative to the rail 40. It will of course be appreciated that the movement of the camming members 68 is synchronized so as to effect a simultaneous withdrawal of the locking pins 62 associated with all of the mounting members 54.

With reference to FIGURE 12, it will be noted that an elongated control cable 72, as well as a biasing spring 74, is associated with each camming member 68 with the biasing spring 74 biasing the associated camming member 68 toward its pin-retracting position. Thus, during those periods when the wing segments 14 and 16, as well as the segment 15 through engagement therewith, are to be locked to the rail 40, a tension will be introduced into the control cables 72 so as to move the camming members 68 against the biasing force of the spring 74 in a manner whereby the spring-loaded locking pins 62 will be allowed to project into locking engagement with the rail 40.

Finally, in order to achieve a shifting of the wing 8 as a unit longitudinally along the plane fuselage, an internally threaded block 76 is fixed to the shaft 40 at a point along the length thereof and projects inwardly of the fuselage for the reception therethrough, parallel to the fuselage, of an externally threaded shaft 78 in a manner whereby a rotation of the shaft 78 will result in a longitudinal movement of the mounting rail 40 within the fuselage, as well as those elements attached thereto, in particular the wing 8 through the mounting units 54. It will of course be appreciated that a movement of the rail 40 will necessitate a release of the locking pins within the mounting units 44. The rotational movement of the shaft 78, referring to FIGURE 8, can be effected through an elongated control cable 80 wound about a control pulley 82 fixed to one end of the shaft 78.

In actual operation, when it becomes desirable to adjust the wing segments, the tension on the control cables 72 is released so as to enable the biasing springs 74 to move the camming members 68 in a manner so as to effect a retraction of the locking pins 62 and a substantial closing off of the pin-receiving holes 64. In this manner, the ribs of the segment mounting units 54 are allowed to slide freely along the corresponding mounting rail 40 as the wing segments are expanded or contracted through a controlled manipulation of the control cable 36 engaged about the pulleys 34 on the segment-manipulating shafts 26. Upon completing the expansion or contraction, tension is again applied to the control cables 72 so as to retract the camming members 68 and allow the pins to effect a locking of the wing segments to the rail 40. After the wing segments have been locked to the rail 40 the entire wing 8 can be adjusted along the fuselage by merely disengaging the rail 40 from the mounting members 44, in the same manner as described supra with the disengagement of the mounting members 54, and effecting a physical movement of the rail 40 itself through the rotation of the control shaft 78. This movement of the wing 8 as a unit is deemed particularly desirable in that it enables a proper location of the wing 8 regardless of the adjusted transverse dimension thereof. Further, with regard to the expansion and contraction, as well as shifting of the wing, attention is directed to FIGURE 1 wherein reference numeral 11 is used to generally designate suitable cover sections which may consist of sliding plates similar to the upper and lower slidably interconnected wing segment plates.

Figure 14:
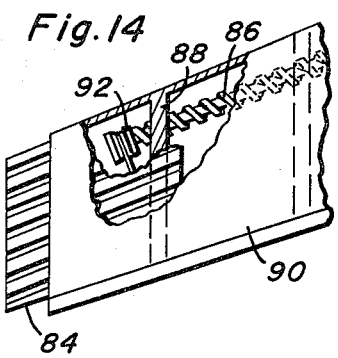
FIGURE 14 illustrates a modification wherein the features of the invention are incorporated into a variable length wing.

FIGURE 14 illustrates the concepts of the wing expansion system of the instant invention incorporated into a wing lengthening arrangement whereby the outer end portion 84 of a wing can be selectively extended or retracted. In this situation, the movement of the outer wing segment 84 is to be controlled through a longitudinally positioned control shaft 86 rotatably mounted within the segment 84 and threadedly engaged through a vertically positioned brace 88 within the innermost wing segment 90, the shaft 86 being manipulated in a suitable manner, such as through a control cable engaged over a control pulley 92, or by means of suitable gearing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. An expansible wing for winged aircraft comprising at least two wing segments, one of said segments being telescopically received within the other of said segments and selectively extensible and retractible relative thereto, said segments having a plurality of slidably interlocked ribs and grooves along substantially the full width of the overlapped portions thereof providing an intimate contact between the segments while allowing for the extension and retraction of one segment relative to the other, and at least one adjusting unit for effecting the selective extension and retraction of the segments, said adjusting unit comprising an elongated shaft, means mounting said shaft in one of said segments solely for rotational movement, said shaft projecting into the other segment with the projecting portion of the shaft constituting a threaded portion, the segment receiving the threaded portion of the shaft including an internally threaded member matingly receiving the threaded portion whereby a rotation of the shaft will effect a movement of the internally threaded member, and consequently the segment within which it is mounted, relative to the segment within which the shaft is rotatably mounted, said wing being transversely expansible, each of said segments extending the full effective length of the wing with one of said segments defining the leading edge of said wing, the other of said segments telescopically projecting from the rear thereof, each of said wing segments having upper and lower spaced panels, the interlocking ribs and grooves extending transversely across both the adjacent upper and the adjacent lower panels of the wing segments, means for selectively fixing and releasing the inner ends of the segments for and against movement relative to each other, and means for effecting a forward and rearward shifting of the entire wing as a unit.

2. In an aircraft, a fuselage and an expansible wing projecting laterally therefrom, said wing comprising three substantially full length segments, said segments constituting a leading segment, an intermediate segment, and a following segment, both the leading segment and the following segment being telescopically and slidably engaged with the intermediate segment, means for simultaneously extending and retracting the leading and following segments relative to the intermediate segment, means for selectively locking both the leading and following segments to the fuselage, and means for effecting a movement of the entire wing as a unit along the fuselage.

3. In an aircraft, a fuselage and an expansible wing projecting laterally therefrom, said wing comprising three substantially full length segments, said segments constituting a leading segment, an intermediate segment, and a following segment, both the leading segment and the following segment being telescopically and slidably engaged with the intermediate segment, means for simultaneously extending and retracting the leading and following segments relative to the intermediate segment, means for selectively locking both the leading and following segments to the fuselage, the means for locking the segments to the fuselage comprises an elongated rail, means securing said rail to said fuselage longitudinally thereof and transverse of the inner end of the wing, at least one mounting member fixed to the inner end of both the leading and following segments, each of said mounting members being slidably engaged with said rail for movement of the corresponding segment therealong, and means in each mounting member selectively engageable with the rail so as to prevent relative movement therebetween.

4. The structure of claim 3 wherein said last mentioned means consists of at least one spring biased pin, said rail including a series of holes therein for selective reception of the pin, and movable camming means for effecting a retraction of said pin out of the corresponding hole so as to enable a sliding of the mounting member, and consequently the segment, along said rail.

5. The structure of claim 4 wherein the means securing said rail to said fuselage consists of a portion slidably receiving said rail, means for selectively fixing said rail against such sliding, and means, upon release of said last-mentioned means, for effecting a longitudinal shifting of the rail, and consequently the entire wing, along the fuselage.

6. The structure of claim 3 wherein said segments include a plurality of slidably interlocked ribs and grooves therebetween, said ribs and grooves being orientated along substantially the full length of the segments.

References Cited by the Examiner
UNITED STATES PATENTS

| | | | |
|---|---|---|---|
| 1,558,090 | 10/1925 | Hunrich | 244—43 |
| 1,653,903 | 12/1927 | Hall | 244—43 |
| 2,350,809 | 6/1944 | Pelessoni | 244—13 |
| 2,463,351 | 3/1949 | Bowers | 244—102 |
| 2,487,465 | 11/1949 | Murray | 244—43 |
| 2,814,454 | 11/1957 | Atkins | 244—121 X |
| 2,858,091 | 10/1958 | Kapenkin | 244—43 |
| 3,000,533 | 9/1961 | Jodock | 244—121 X |
| 3,004,737 | 10/1961 | Boyle | 244—102 |

MILTON, BUCHLER, *Primary Examiner.*

FERGUS S. MIDDLETON, *Examiner.*

G. P. EDGELL, L. C. HALL, B. BELKIN,
*Assistant Examiners.*